Oct. 15, 1963  H. GRUPP  3,106,770
PORTABLE APPARATUS FOR APPLYING TRAVELERS TO THE
RING OF A SPINNING OR TWISTING FRAME
Filed Nov. 28, 1960  4 Sheets-Sheet 1
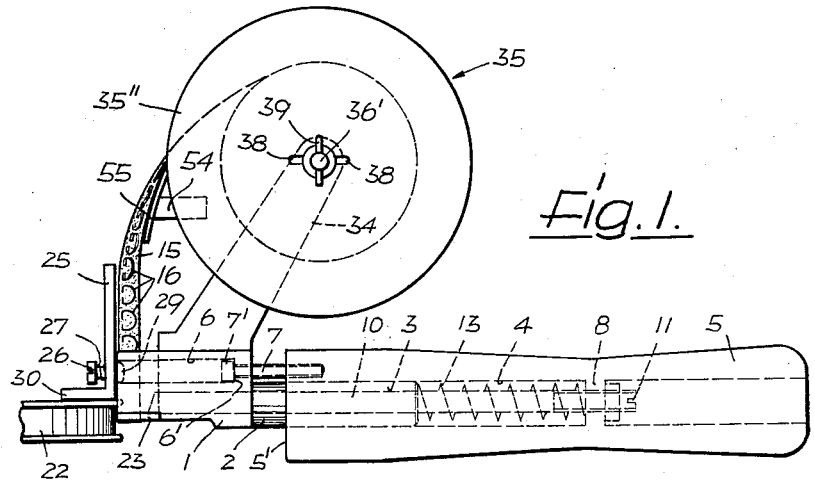
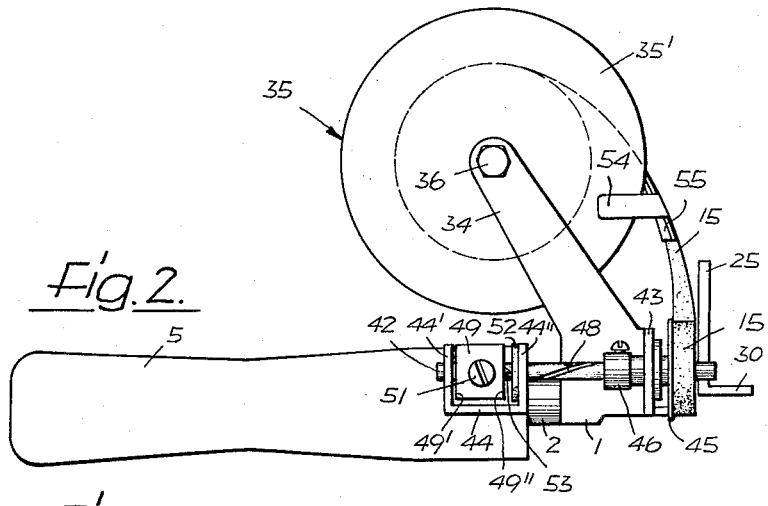
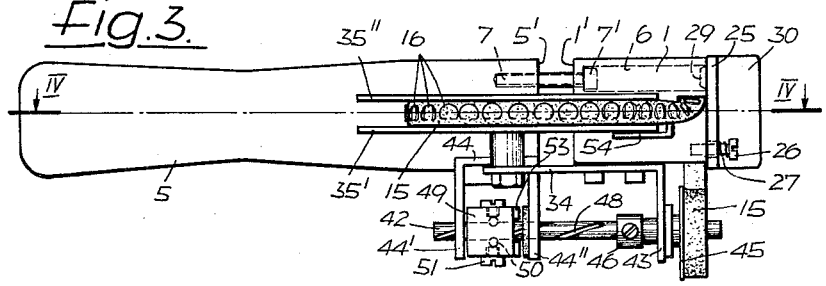
INVENTOR
Heinrich Grupp
Ernest Montague
BY
ATTORNEY

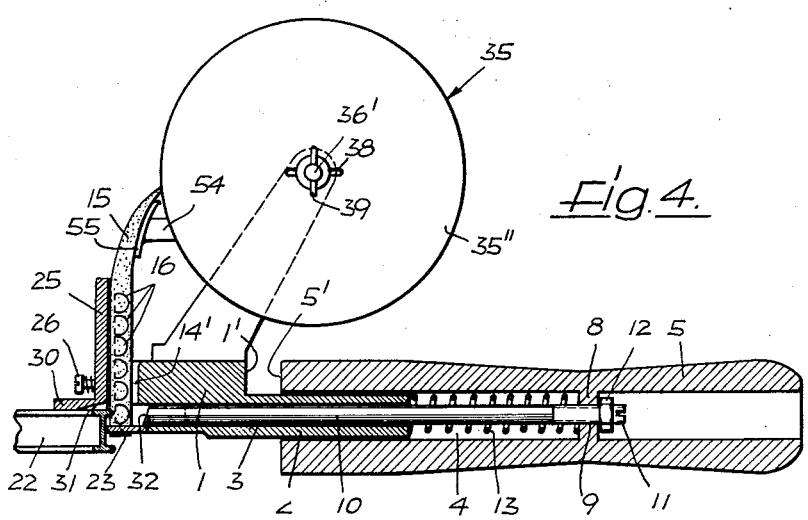
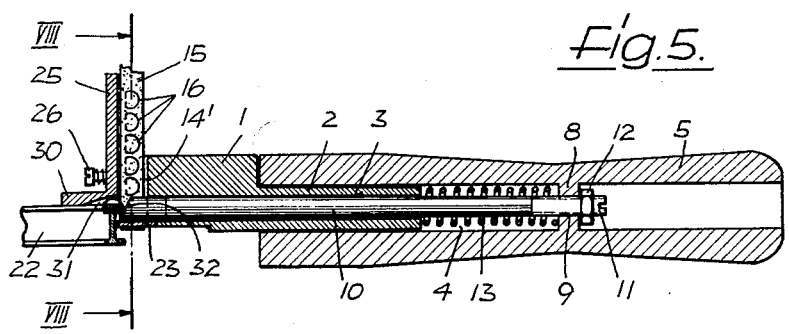
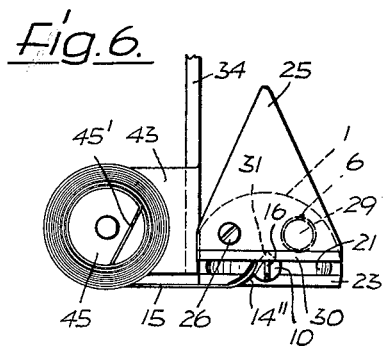 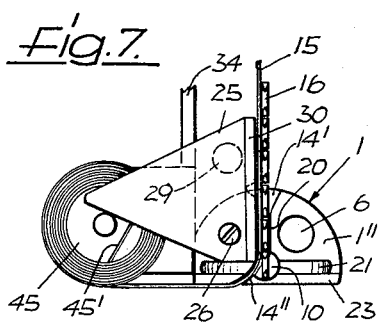

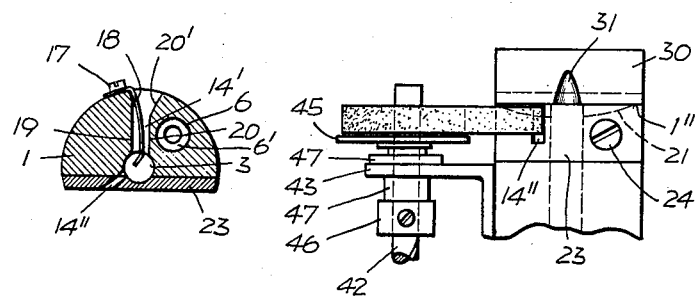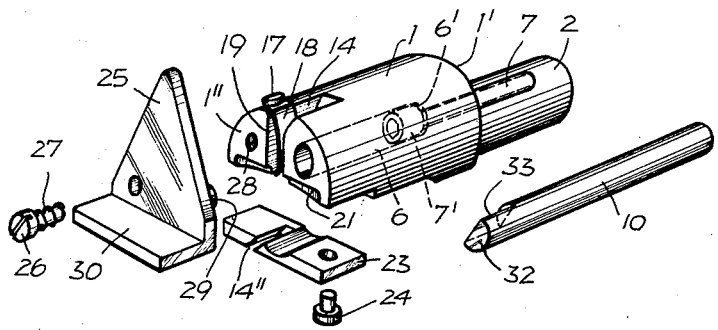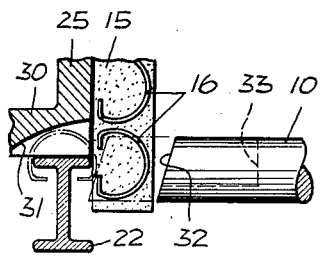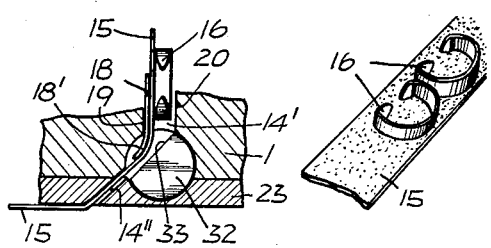

Oct. 15, 1963 — H. GRUPP — 3,106,770
PORTABLE APPARATUS FOR APPLYING TRAVELERS TO THE RING OF A SPINNING OR TWISTING FRAME
Filed Nov. 28, 1960 — 4 Sheets-Sheet 4
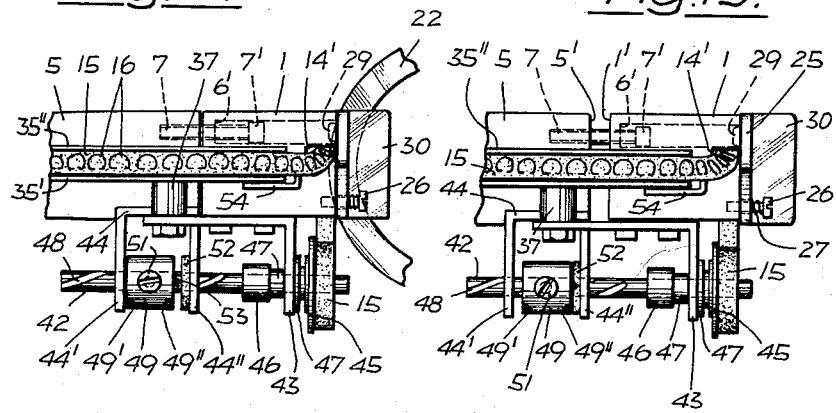
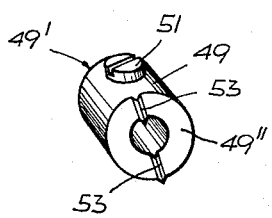 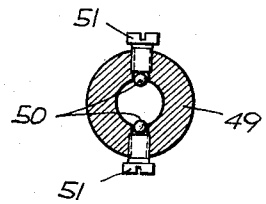
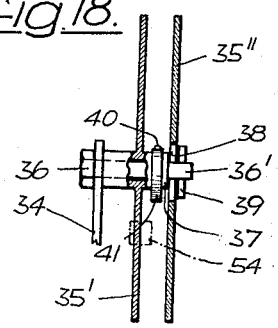 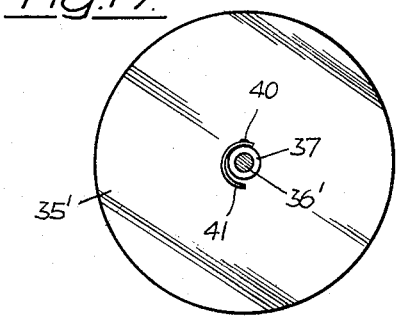
INVENTOR
Heinrich Grupp
BY Ernest G. Montague
ATTORNEY United States Patent Office 3,106,770
Patented Oct. 15, 1963

3,106,770
PORTABLE APPARATUS FOR APPLYING TRAVELERS TO THE RING OF A SPINNING OR TWISTING FRAME
Heinrich Grupp, Nenningen, near Goppingen, Wurttemberg, Germany, assignor to Otra Ringlaüfer G.m.b.H., Salach, Wurttemberg, Germany, a firm of Germany
Filed Nov. 28, 1960, Ser. No. 72,157
Claims priority, application Germany Dec. 2, 1959
10 Claims. (Cl. 29—207)

The present invention relates to a portable apparatus in the nature of a manually operated tool which serves as an accessory for ring spinning and twisting frames for feeding travelers from a magazine to the spinning or twisting ring of such a machine and for applying them upon such a ring.

The apparatus of this type which were known prior to the present invention had the disadvantage that the travelers which usually consist of metal, plastic, or the like were strung in a row on a guide member which either was rod-shaped and extended transversely to the main longitudinal direction of the apparatus, that is, tangentially to the spinning or twisting ring after the apparatus was applied thereon, or which was of a helical shape and had an axis which likewise extended transversely to the main longitudinal direction of the apparatus and above the apparatus. The apparatus of either of these types were necessarily very bulky and they could also only be used with travelers of a particular shape and width. Therefore, if travelers of a different shape or width were to be used, a different apparatus had to be provided. Furthermore, with these known apparatus, the travelers had to be fed from the magazine by spring force, insofar as such feeding was not carried out by hand or by gravity. Therefore, depending upon the contents of the magazine, a spring force of a smaller or greater strength had to be exerted in order to feed the travelers to the desired position.

The principal objects of the present invention are to provide an apparatus for the mentioned purpose which is relatively small as compared with the previous bulky apparatus, which is not dependent upon the use of travelers of a particular shape and width, in which the feeding of the travelers from the magazine to the working position is carried out independently of any spring force, and which is of a light weight and easy to manipulate with one hand.

For attaining these objects, the apparatus according to the present invention essentially consists of a conveyer belt, for example, of a textile material which carries the travelers which are removably secured thereto in a series behind each other for feeding them from a magazine to the place of application to the ring of a spinning or twisting frame, and of a manually operated plunger which is adapted to sever the travelers one after the other from the conveyer belt and to press them individually upon the ring, and the movement of which is utilized for advancing the conveyer belt in a step-by-step movement.

More specifically, the apparatus according to the present invention comprises a head member which may be applied by a handle to the spinning or twisting ring and has a slot therein through which the conveyer belt is guided, and a bore which terminates into the slot and in which the plunger is guided. For insuring a proper application of the travelers upon the ring of the spinning or twisting frame, this head of the apparatus is further provided with an arcuate recess in its front surface which has a curvature similar to that of the ring and which permits the head to be applied against the ring. This arcuate recess is disposed in the head so that its central radial plane extends parallel to the axis of the plunger and intersects the lower part of the bore in which the plunger is guided. This head of the apparatus further carries a supply or feed reel on which the conveyer belt with the travelers removably attached thereto may be mounted, and a roller upon which the conveyer belt may be wound after the travelers have been severed therefrom. The handle of the apparatus in which the plunger is mounted is connected to but slidable relative to the head, and the extent of this movement of the handle is limited in both directions. The apparatus is further designed so that the reverse movement of the handle will occur automatically by the action of a spring and the conveyer belt will be intermittently fed during and as a result of this reverse movement.

These and further objects, features, and advantages of the present invention will become more apparent from the following detailed description thereof, particularly when the same is read with reference to the accompanying drawings, in which:

FIGURES 1 and 2 are side views of the new apparatus, as seen from opposite sides;
FIG. 3 is a top view of FIG. 2;
FIG. 4 is a cross section of the apparatus taken along lines 4—4 of FIG. 3, and it illustrates the apparatus applied against a spinning or twisting ring and in the position immediately preceding the actuation of the handle;
FIG. 5 is a cross section similar to FIG. 4, but it illustrates the apparatus in the position at the end of the actuation of the handle;
FIGS. 6 and 7 are front views of the apparatus with the cover thereof in the closed and open position, respectively;
FIG. 8 is a cross-section taken along the lines 8—8 of FIG. 5;
FIG. 9 is a bottom plan view of the parts, as shown;
FIG. 10 is an exploded perspective view of the different parts of the head including the plunger;
FIG. 11 is a part of FIG. 4 on an enlarged scale;
FIG. 12 is a part of the head of the apparatus in an enlarged cross section taken through the area of the slot;
FIG. 13 is a perspective view of a part of the conveyer belt in the form of a carrier strip with travelers removably attached thereto;
FIGS. 14 and 15 are top views of the front part of the apparatus in two different positions of the handle and of the nut of the winding-on shaft;
FIG. 16 is a perspective view of the nut of the winding-on shaft;
FIG. 17 is a cross section of the nut shown in FIG. 16;
FIG. 18 is a cross section of the supply or feed reel for the carrier strip; while
FIG. 19 is a partial front view of the feed reel from which one reel disk has been removed.

Referring now to the drawings, the apparatus according to the present invention, as illustrated in FIGS. 1 to 5, consists of a head 1, shown in detail in FIG. 10, which is provided with two, preferably parallel end surfaces 1' and 1" and a cylindrical bushing 2 which projects from the end surface 1' and is provided with a bore 3 which also extends through the head 1. A handle 5 has a longitudinal bore 4 therein into which the bushing 2 is inserted, so that handle 5 is slidable along the bushing 2. The forward movement of the handle 5 is limited by the engagement of its front end 5' with the rear end surface 1' of the head 1, while its rearward movement is limited by a screw 7 which is inserted into another bore 6 in the head 1 parallel to the bore 3 and is screwed into the handle 5, and the head 7' of the screw 7 is slidable within the bore 6 in the head 1, until at the end of the rearward movement of the handle 5, the screw head 7' engages with the bottom flange 6' of the bore 6. The bore 4 in the handle is interrupted by a partition 8 in which coaxially with the bore 4 a threaded bore 9 is provided into which the threaded end of a plunger 10 is screwed, the slotted end 11 of which is accessible by a screw driver through the outer end of bore 4. The plunger 10 is in this manner adjustable in the axial direction, and it is adapted to be locked in the adjusted position by a check nut 12. Intermediate the bushing 2 and the partition 8, the plunger 10 carries a compression spring 13, whereby the handle 5, when released, will be automatically returned to its rearmost position, as illustrated in FIGS. 1 and 4.

The front end 1″ of the head 1 is provided with an inlet slot 14′, as shown particularly in FIGS. 7, 8, 10 and 12, which extends radially inward from the peripheral surface of the head 1 and into the bore 3 and through which a conveyer belt in the form of a carrier strip 15, for example, of a flexible fabric, is passed in the downward direction upon which a continuous series of, for example, C-shaped travelers 16, as shown in FIG. 13, are removably secured, for example, by being glued upon the belt 15. The slot 14′ is made of a length, as seen in the axial direction of head 1, which is substantially in accordance with the width of the carrier belt 15, while the width of the slot 14′ is made of a size, so as to permit the travelers 16 of the greatest occurring width to be passed on the belt 15 through the slot 14′. A leaf spring 18, which is secured at one end to the peripheral surface of the head 1 by means of a screw 17, extends through the inlet slot 14′ along the wall 19 thereof which faces toward the surface of the belt 15, which does not carry any travelers 16. This leaf spring 18 presses the belt 15 with the travelers 16 thereon against the opposite wall 20 of the slot 14′ which is beveled outwardly at the upper end 20′, where the belt 15 passes into the slot 14′ so as to insure that the travelers 16 will not be torn off the belt 15, when entering into the inlet slot 14′.

At the front side 1″ of the head 1, which in the operation of the apparatus faces toward the spinning or twisting ring 22, the head 1 is provided with an arcuately curved groove 21, as shown particularly in FIGS. 6, 7, and 10, the central radial plane of which extends parallel to the axis of the plunger 10 and the bore 3 and at right angles to the slot 14′. This groove 21 is required for applying the apparatus against the spinning or twisting ring 22. While the slot 14′ in the head 1 serves as an inlet slot for guiding the carrier belt 15 with the travelers 16 attached thereto, the head 1 is further provided with an outlet slot 14″ for guiding the carrier belt 15 alone after the travelers 16 are removed therefrom. This outlet slot 14″, which forms a continuation of the inlet slot 14′, extends in the head 1 from the intersection between the wall of the bore 3 and the groove 21 and at such an angle to the inlet slot 14′ that it angles away from the axis of the plunger 10, so that the empty carrier belt 15 passing through the slots 14′ and 14″ will not interfere with the transfer of travelers 16 to the spinning or twisting ring 22. In order to facilitate the operation of producing the arcuate groove 21 in the head 1, the outlet slot 14″ is provided in a separate plate 23 which is removably secured to the head 1 by means of a screw 24.

The front side 1″ of the head 1 further carries a cover plate 25 which is pivotably connected to the head 1 by means of a screw 26 which carries a small compression spring 27 and is screwed into a tapped bore 28 in the head 1. On its side facing toward the front side 1″ of the head 1, the cover 25 carries a pin 29 which, when the cover 25 is in the closed position, engages under the action of the spring 27 the bore 6 in the cover 1. The cover 25 is further provided on its lower edge with a flange 30 which projects at right angles therefrom and extends above the groove 21 and is adapted to rest on the spinning or twisting ring 22 when the apparatus is applied thereon. On its lower side, the flange 30 has a recess 31 which extends into the cover 25, as shown particularly in FIGS. 9 and 11 and permits the individual travelers 16 to slide therethrough after they have been severed from the carrier belt 15 by the plunger 10.

The plunger 10 has a beveled front surface 32, as shown in FIGS. 4, 5, and 11, which is designed so that, when it engages with a traveler 16, it will exert a pressure thereon in an upwardly inclined direction at the moment when the lower arm of the traveler has passed slightly below the upper flange of the spinning or twisting ring 22, as shown in FIG. 11, so that the upper part of traveler 16 which is slightly resilient will then snap over the upper flange of the ring 22. The plunger 10 also has on its front end a lateral flat surface 33 which is at least as long as the length of the inlet slot 14′ and permits the conveyer belt 15 to pass through the bore 3 in the head 1, as shown particularly in FIG. 12.

The head 1 of the apparatus has an arm 34 projecting therefrom which carries on its free end a supply or feed reel 35 for the conveyer belt 15. The shaft of the reel 35 which extends at right angles to the axis of the plunger 10 is formed by a bolt 36, as shown especially in FIGS. 18 and 19, by means of which one disk 35′ of the reel which has a hub 37 is secured to the arm 34. The second disk 35″ of the feed reel 35 is removably secured to the shank 36′ of the bolt 36 and is provided with a slot 38 by means of which the disk 35″ may be fitted over a crosspin 39 on the shank 36′ until it engages with the end of the hub 37. If the disk 35″ is then turned 90° in one direction or the other, it will be clamped tightly between the hub 37 and the crosspin 39. After the disk 35″ is removed from the bolt 36, a spool or the like consisting, for example, of a small cardboard tube, on which the carrier belt 15 is wound may be slipped over the hub 37. A small leaf spring, which curves around the hub 37 and is secured thereto by a small screw 40, acts upon the inner surface of the mentioned spool and exerts a braking action upon the carrier belt while it is being unwound from the reel 35.

The apparatus further comprises a winding-on shaft 42, as shown particularly in FIGS. 2, 3, 14, and 15, which extends parallel to the axis of the feed rod 10 and the bore 3 in the head 1 and which is rotatably mounted at one end in a flange 43 on the arm 34 which supports the feed reel 35 and at the other end in the two arms 44′ and 44″ of a U-shaped bearing bracket 44 which is secured to the handle 5. This shaft 42 carries a winding-on roller 45 upon which the empty carrier belt 15 is wound and which is preferably provided with a slot 45′, as shown in FIGS. 6 and 7, into which the end of the carrier belt is inserted. The shaft 42 is prevented from shifting in the axial direction by the roller 45 and by a setting ring 46 which is mounted on the shaft 42 at the other side of the flange 43 and is spaced from the latter by one or more washers 47 (FIG. 9). At the side of the shaft 42 which is mounted in the bearing bracket 44, this shaft 42 is provided with a pair of helical grooves 48 and it carries between the arms 44′ and 44″ of the bracket 44 a nut 49 which, in place of internal screw threads, is provided with two diametrically opposite balls 50, as shown in FIG. 17, which engage into and are adapted to roll along the two helical grooves 48 and are held in a fixed position in the nut 49 by a pair of screws 51 which permit the friction of the balls 50 in the grooves 48 to be adjusted. Since the nut 49 is movable in the axial direction between the arms 44′ and 44″ of the bracket 44, it will, when the handle 5 is moved forwardly, rotate freely along the helical grooves 48 in the shaft 42 toward the arm 44′. When the handle 5 is retracted, however, the nut 49 should be arrested in a fixed position so that the shaft 42 will be rotated and the empty end of the carrier belt 15 will be wound on the roller 45. For this purpose, the side 49″ of the nut 49 which faces toward the arm 44″ of the bracket 44 has a pair of diametrically opposite teeth 53 projecting therefrom, as shown particularly in FIG. 16, while the arm 44″ has a disk 52 of an elastic material secured thereto. During the reverse movement of the handle 5 and thus also of the bracket 44, the elastic disk 52 will engage with teeth 53 which will thus be pressed into the disk 52 and will, therefore, prevent any further rotation of the nut 49. During the further reverse movement of the handle 5, the nut 49 will, therefore, move merely in the axial direction, and this movement will, by balls 50 rolling along the helical grooves 48, be transformed into a rotary movement of the shaft 42, whereby the roller 45 will be rotated to wind up the empty end of the carrier belt 15. Since the axes of the feed reel 35 and of the wind-on roller 45 are disposed at right angles to each other and the inlet slot 14' extends parallel to the axis of the wind-on roller 45, the carrier strip 15 will be twisted 90° between the feed reel 35 and the inlet slot 14'. In order to facilitate this twisting movement, the carrier belt 15 is guided by a similarly twisted guide plate 55 which is mounted on the reel disk 35' by means of a bracket 54.

Although my invention has been illustrated and described with reference to the preferred embodiment thereof, I wish to have it understood that it is in no way limited to the details of such embodiment, but is capable of numerous modifications within the scope of the appended claims.

I claim:

1. A portable, manually operated apparatus forming a separate tool for applying travelers particularly upon a flange of a ring spinning or twisting frame, comprising
 a head having two opposite end surfaces and a bore within said head extending between and through said end surfaces,
 one end of said head having an inlet slot extending substantially radially inwardly from the peripheral surface of said head and into said bore,
 a conveyor belt passing through said inlet slot,
 a plurality of substantially C-shaped travelers removably secured to and spaced apart from each other on one side of said conveyor belt,
 feeding means mounted on said head for feeding said belt in a stepwise movement toward and through said inlet slot and said bore, so that, upon stopping said belt, a traveler is disposed in front of said bore,
 a ring having a flange and adapted to receive said travelers,
 means on said head adjacent said bore for applying said apparatus against said ring,
 a flanged support engaging one of said end surfaces of said head and having a curved recessed guide substantially opposite said bore,
 a plunger guided within and reciprocating in said bore for successively engaging with and severing said travelers, during their position in front of said plunger, from said belt,
 said plunger having a beveled front surface and a lateral flat surface portion adjacent said beveled front surface of a length in the axial direction of said plunger at least corresponding to the axial length of said inlet slot, in order to permit passing of said conveyor belt through said inlet slot and through said bore in the forward position of said plunger,
 said beveled front surface of said plunger engaging and removing said travelers from said belt for fitting said travelers over said flange of said ring by feeding said travelers through said curved recessed guide of said flanged support,
 means associated with said head for exerting an impact upon said plunger to move the same from a basic rear position forwardly toward and against said travelers,
 means for returning said plunger to said basic rear position, and
 means operated by said returning means for actuating said feeding means.

2. The apparatus, as set forth in claim 1, which includes means for axial adjustment of said plunger in said basic rear position.

3. The apparatus, as set forth in claim 1, wherein said feeding means comprises
 a supporting bracket secured to and projecting from said head,
 a shaft rigidly secured to said bracket and disposed at a right angle to the longitudinal axis of said bore of said head,
 a first disk rigidly secured to said shaft and having a hub of a length at least equal to the width of said belt,
 a second disk removably secured to said shaft and spaced by said hub from said first disk,
 a leaf spring secured at one end to said hub and spirally wound around said shaft, so that its free end is spaced apart from said said shaft in order to exert a braking action upon said conveyor belt.

4. The apparatus, as set forth in claim 1, which includes
 a leaf spring mounted on said head and extending into said inlet slot for engagement with the bare side of said belt,
 in order to urge said travelers on the opposite side of said belt toward the adjacent wall of said inlet slot.

5. The apparatus, as set forth in claim 4, wherein said adjacent wall is beveled outwardly at the upper end thereof in order to insure that said travelers are not torn off said belt during their travel through said inlet slot.

6. The apparatus, as set forth in claim 1, wherein said feeding means comprises a feed reel rotatably mounted on said head and having said conveyor belt wound thereon,
 the rotating axis of said feed reel being disposed at a right angle to the longitudinal axis of said bore in said head,
 a winding-on roller rotatably mounted on said head and receiving said conveyor belt upon removing therefrom said travelers,
 the rotating axis of said winding-on roller being disposed parallel to the longitudinal axis of said bore of said head,
 said means for returning said plunger to said basic rear position comprises a bushing projecting axially from said head and having an axial bore as an extension of said bore of said head,
 a handle mounted on and slidable in axial direction along said bushing and having a bore receiving said bushing,
 means for adjustably securing said plunger to said handle,
 said feeding means comprises a shaft disposed parallel to said bore in said head,
 one end of said shaft being rotatably but non-slidably mounted on said head,
 said winding-on roller is secured to said end of said shaft,
 the latter having a multiple thread,
 a bracket secured to said handle and supporting the other end of said shaft for rotation therein,
 a nut on said shaft and meshing said multiple thread of the latter,
 said nut being axially movable for a limited path and rotating freely on said shaft during the forward movement of said handle and moving axially thereby and locked against rotation during the rearward movement of said handle, thereby rotating said shaft and winding said conveyor belt on said winding-on roller.

7. The apparatus, as set forth in claim 6, wherein said means for preventing rotation of said nut during the rearward movement of said handle comprises
 teeth projecting axially from one end face of said nut facing toward said head,
 a disk-like member of elastic material is secured to the side of said bracket adjacent to and facing toward said teeth, and the latter pressing into said disk-like member preventing any rotation of said nut upon urging, during the rearward movement of said handle, said disk-like member against said teeth.

8. The apparatus, as set forth in claim 6, wherein said handle has a partition wall defining a central opening intermediate the ends of its bore, said plunger is threadedly secured to said central opening of said partition wall, a compressing spring surrounding said plunger and disposed between said bushing and said partition wall, said compressing spring tends to move said handle and thereby said plunger into its rearmost position, the front end face of said handle abutting the rear end face of said head in the forwardmost position of said handle, and said head having a second bore disposed parallel to said first bore, and a screw bolt having a head inserted into said second bore and screwed into said handle and said head abutting at the rear end of said bore and limiting the rearward movement of said handle.

9. The apparatus, as set forth in claim 1, wherein said means on said head adjacent said bore for applying said apparatus against said ring comprises a front part of said head having an arcuate groove, the latter having a central radial plane disposed at a right angle to the longitudinal axis of said plunger and to said inlet slot and adapted to facilitate and insure the application of said apparatus against said ring such, that upon applying the apparatus to said ring, the forward end of said bore is in front of said flange of said ring.

10. The apparatus, as set forth in claim 9, wherein said flanged support comprises a cover portion and a flange portion, said cover portion pivotally secured to the front end surface of said head and adapted when pivoted to its working position to cover said front surface above said arcuate groove, means for locking said cover in its working position, and said flange portion extending in said working position above said arcuate groove and across said cover portion and resting upon the upper surface of said ring, when the apparatus is applied against said ring.

References Cited in the file of this patent

UNITED STATES PATENTS

| | | |
|---|---|---|
| 1,073,280 | Owen | Sept. 16, 1913 |
| 1,189,448 | Hevey | July 4, 1916 |
| 2,908,908 | Steinmetz | Oct. 20, 1959 |